US009800091B2

(12) United States Patent
Nugent, Jr. et al.

(10) Patent No.: US 9,800,091 B2
(45) Date of Patent: Oct. 24, 2017

(54) AERIAL PLATFORM POWERED VIA AN OPTICAL TRANSMISSION ELEMENT

(75) Inventors: Thomas J. Nugent, Jr., Bellevue, WA (US); David Bashford, Kent, WA (US); Jordin T. Kare, Seattle, WA (US)

(73) Assignee: LASERMOTIVE, INC., Kent, WA (US)

( * ) Notice: Subject to any disclaimer, the term of this patent is extended or adjusted under 35 U.S.C. 154(b) by 839 days.

(21) Appl. No.: 14/124,993

(22) PCT Filed: Jun. 9, 2012

(86) PCT No.: PCT/US2012/041782
§ 371 (c)(1),
(2), (4) Date: Mar. 19, 2014

(87) PCT Pub. No.: WO2013/052178
PCT Pub. Date: Apr. 11, 2013

(65) Prior Publication Data
US 2015/0041598 A1   Feb. 12, 2015

Related U.S. Application Data
(60) Provisional application No. 61/495,174, filed on Jun. 9, 2011.

(51) Int. Cl.
*B64F 3/02* (2006.01)
*H02J 17/00* (2006.01)
(Continued)

(52) U.S. Cl.
CPC ............ *H02J 17/00* (2013.01); *B64C 39/022* (2013.01); *B64C 39/024* (2013.01); *B64F 3/02* (2013.01);
(Continued)

(58) Field of Classification Search
None
See application file for complete search history.

(56) References Cited

U.S. PATENT DOCUMENTS

| 4,402,479 A | * | 9/1983 | Phipps, III | ............... B64B 1/50 244/116 |
| 5,115,997 A | * | 5/1992 | Peterson | ................... B64B 1/50 244/25 |

(Continued)

FOREIGN PATENT DOCUMENTS

| EP | 2 228 301 A2 | 9/2010 |
| WO | 2010/032251 A2 | 3/2010 |

OTHER PUBLICATIONS

International Search Report, dated Mar. 25, 2013, for corresponding International Application No. PCT/US12/41782, 2 pages.

*Primary Examiner* — Tien Dinh
*Assistant Examiner* — Michael A Fabula
(74) *Attorney, Agent, or Firm* — Seed IP Law Group LLP

(57) ABSTRACT

An aerial platform receives power in the form of light, for example laser light, transmitted via an optical fiber from a remote optical power source. The platform comprises a receiver which converts at least a portion of the light to a different form of power, for example electric power. The platform also comprises a propulsion element which consumes the different form of power to generate propulsive thrust. Supplying power to the aerial platform from a remote source enables the platform to remain aloft longer than a battery or fuel tank carried by the platform would allow. Transmitting the power in the form of light is preferable in many cases to transmitting electric power, because electrical conductors are generally heavier than optical fibers, and are hazardous in the presence of lightning or a high-voltage power line.

29 Claims, 9 Drawing Sheets

(51) Int. Cl.
  *B64C 39/02* (2006.01)
  *B64F 3/00* (2006.01)
  *H02J 7/02* (2016.01)

(52) U.S. Cl.
  CPC .. *B64C 2201/021* (2013.01); *B64C 2201/022* (2013.01); *B64C 2201/027* (2013.01); *B64C 2201/042* (2013.01); *B64C 2201/06* (2013.01); *B64C 2201/148* (2013.01); *B64F 3/00* (2013.01); *H02J 7/025* (2013.01)

(56) References Cited

U.S. PATENT DOCUMENTS

| | | | | |
|---|---|---|---|---|
| 5,503,350 | A * | 4/1996 | Foote | B64C 39/024 244/1 R |
| 5,796,890 | A * | 8/1998 | Tsuji | G08C 23/06 385/24 |
| 6,325,330 | B1 * | 12/2001 | Lavan, Jr. | B64B 1/50 244/24 |
| 6,364,253 | B1 * | 4/2002 | Cavanagh | B64C 13/20 244/190 |
| 6,407,535 | B1 * | 6/2002 | Friedman | B64G 1/428 244/1 R |
| 6,422,506 | B1 * | 7/2002 | Colby | B63B 49/00 114/242 |
| 6,792,259 | B1 * | 9/2004 | Parise | B01F 5/0614 320/109 |
| 8,788,119 | B2 * | 7/2014 | Tillotson | G05D 1/101 701/3 |
| 8,982,333 | B2 * | 3/2015 | Guetta | B64B 1/50 356/4.01 |
| 2002/0046763 | A1 | 4/2002 | Berrios et al. | |
| 2004/0156400 | A1 * | 8/2004 | Caplan | H01Q 1/248 372/5 |
| 2004/0167682 | A1 | 8/2004 | Beck et al. | |
| 2005/0103943 | A1 * | 5/2005 | Tanielian | B64C 39/024 244/190 |
| 2005/0190427 | A1 * | 9/2005 | Steinsiek | B64G 1/428 359/237 |
| 2007/0019693 | A1 * | 1/2007 | Graham | H02J 17/00 372/38.09 |
| 2007/0200027 | A1 * | 8/2007 | Johnson | B64C 39/022 244/3.1 |
| 2008/0017239 | A1 * | 1/2008 | Tillotson | H01L 31/0232 136/246 |
| 2008/0115716 | A1 * | 5/2008 | Wrage | B63H 9/06 114/343 |
| 2008/0245930 | A1 * | 10/2008 | Nayfeh | B64D 27/24 244/53 R |
| 2008/0265086 | A1 * | 10/2008 | Lee | B64B 1/50 244/30 |
| 2010/0012819 | A1 * | 1/2010 | Graham | H02J 5/00 250/205 |
| 2011/0222047 | A1 * | 9/2011 | Guetta | B64B 1/50 356/4.01 |
| 2012/0150364 | A1 * | 6/2012 | Tillotson | G05D 1/101 701/3 |
| 2013/0115544 | A1 * | 5/2013 | Davidson | B64B 1/50 429/505 |

* cited by examiner

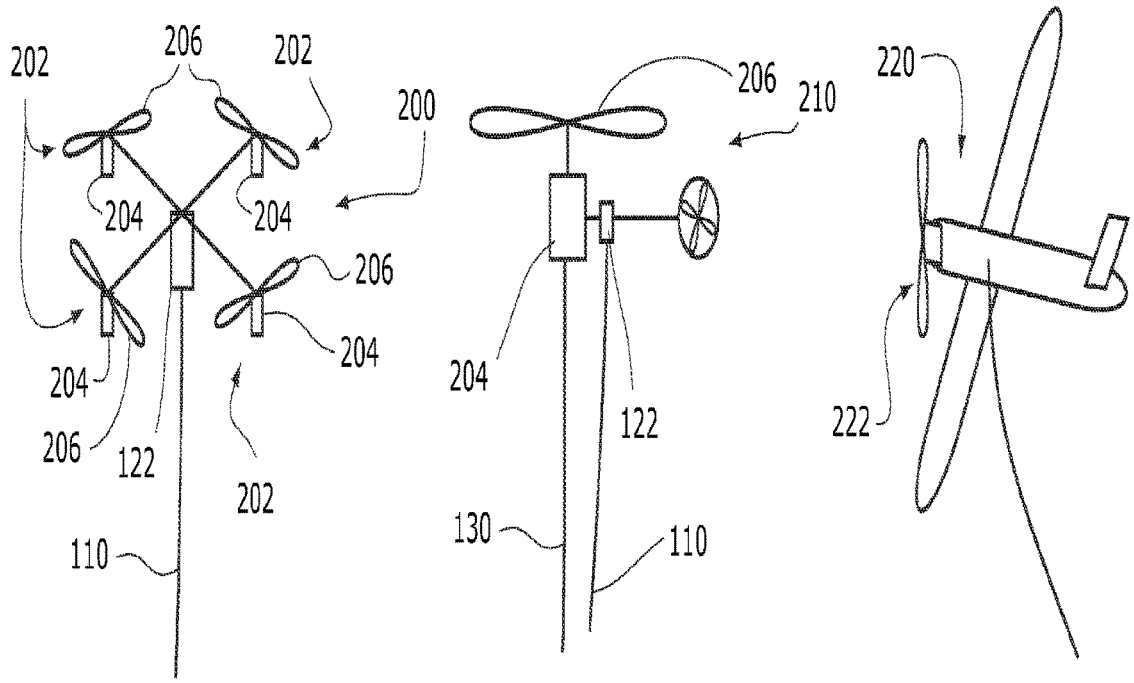
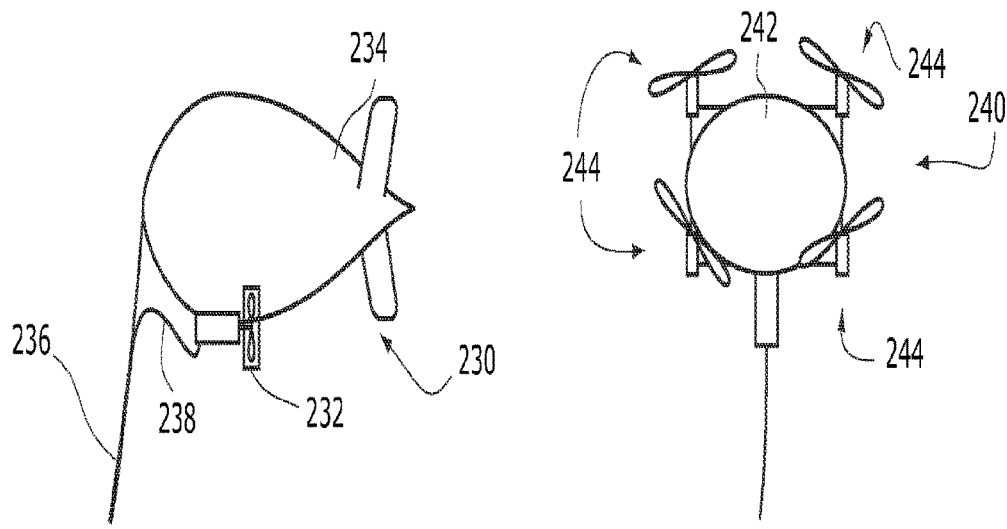
FIG. 2A  FIG. 2B  FIG. 2C
FIG. 2D  FIG. 2E

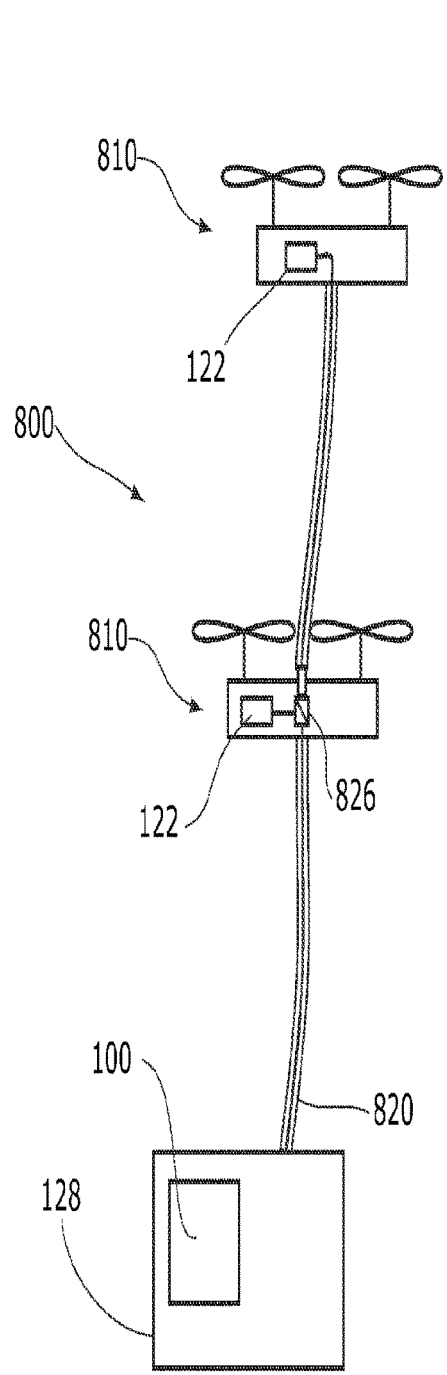
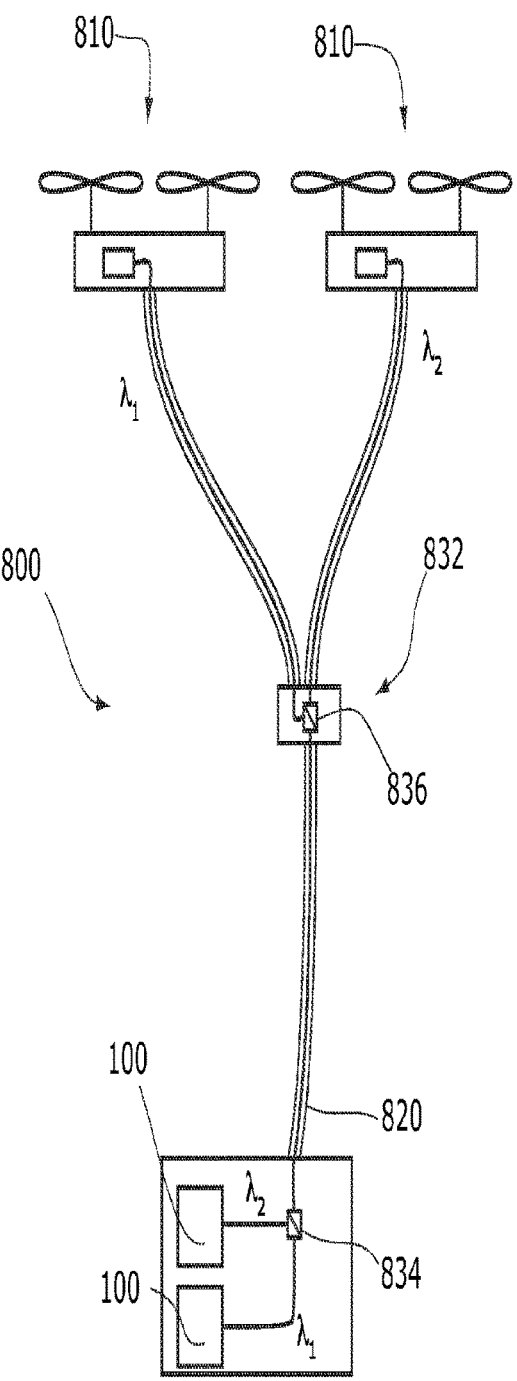
FIG. 8A
FIG. 8B

AERIAL PLATFORM POWERED VIA AN OPTICAL TRANSMISSION ELEMENT

CROSS REFERENCE TO RELATED APPLICATION AND CLAIM OF PRIORITY

This application claims priority from commonly owned U.S. Provisional Patent Application 61/495,174 filed 9 Jun. 2011, and titled "System for a Persistent Aerial Platform", which is presently incorporated by reference.

BACKGROUND

There are many applications for stationary or slow-moving platforms located from a few tens to thousands of feet above the ground, including overhead photography, video observation, and relaying communications. Some applications may require a platform which can remain stationary for many hours, for example for security monitoring. Others may require a platform which can be quickly deployed, for example for police or emergency services, or news gathering.

Existing options for such platforms include fixed or deployable (e.g., truck-mounted) towers or masts, manned helicopters, tethered or free-flying lighter-than-air (LTA) vehicles such as blimps, and vertical-takeoff-and-landing (VTOL) unmanned aerial vehicles (UAVs) using either battery power or fuel-burning engines. These have various disadvantages. For example, towers and masts in non-permanent applications are limited to a few tens of feet of height. Manned helicopters are expensive to purchase and operate, noisy, and have limited flight time. Existing UAVs, particularly VTOL UAVs, also have limited flight time, and are not allowed to fly in many areas. Fuel-burning VTOL UAVs are noisy. Tethered blimps are difficult to deploy, require expensive helium, and are not usable in high winds.

There exist VTOL UAVs which are powered by electricity transmitted through a tether containing electrical conductors, for example the IAI (Israeli Aircraft Industries) ETOP (Electric Tethered Observation Platform). However, electrical tethers are necessarily heavy, either due to the weight of the metallic conductors or, if high voltage is used to reduce the conductor size, the weight of the insulation. Electrically-conducting tethers also present a safety hazard in the presence of lightning or overhead power lines.

It is known in the art to provide power for propulsion to an airborne platform via free-space transmission of electromagnetic radiation, at either microwave or optical wavelengths. Free-space transmission is the transmission of energy from one location to another location without the use of a conduit that couples the two locations to each other, for example a wire or a cable. However, free-space transmission presents hazards associated with exposure to high power microwaves or lasers, and requires regulatory approvals and stringent safety measures. Free-space laser transmission is also subject to blockage by clouds, fog, or precipitation.

It is also known in the art to provide, through a tether which includes a tube or hose, a flammable/explosive fuel to an airborne platform that uses a combustion engine for propulsion. Providing flammable/explosive fuel through a tube leads to a heavy tether, and presents a fire or explosion hazard if the tube is damaged. In addition, combustion engines are noisy, and require frequent maintenance.

There is therefore a need for a class of platforms which can avoid many of these disadvantages, and in particular which can be deployed quickly, remain in place for long periods, fly safely and quietly, operate stably in a wide range of conditions, and readily reach altitudes up to at least several hundred feet.

SUMMARY

In an aspect of the invention, an aerial platform receives power in the form of light, for example laser light, transmitted via an optical fiber from a remote optical power source. The platform comprises a receiver which converts at least a portion of the light to a different form of power, for example electric power. The platform also comprises a propulsion element which consumes the different form of power to generate propulsive thrust. Supplying power to the aerial platform from a remote source enables the platform to remain aloft longer than a battery or fuel tank carried by the platform would allow. Transmitting the power in the form of light is preferable in many cases to transmitting electric power, because electrical conductors are generally heavier than optical fibers, and are hazardous in the presence of lightning or a high-voltage power line.

In at least one embodiment, a system includes an optical transmission element, an optical power source coupled to an end of the optical transmission element and operable to transmit optical power towards another end of the optical transmission element, and an aerial platform. The system also includes an optical power receiver attached to the aerial platform and coupled to the optical transmission element, and the optical power receiver is operable to receive optical power and convert at least a portion of the optical power into a second form of power. The system further includes a propulsion element operable to use at least a portion of the second form of power produced by the optical power receiver to propel the aerial platform.

In some cases, the optical transmission element of the system includes an optical fiber, and in some cases, the optical transmission element includes at least one of a single-mode optical fiber, a multimode step-index optical fiber, a multimode gradient-index optical fiber, a photonic crystal fiber, and a plastic optical fiber.

In some cases, the aerial platform of the system includes at least one of a fixed-wing unmanned aerial vehicle, a vertical-takeoff-and-landing unmanned aerial vehicle, and an aerostat.

In some cases, the propulsion element of the system is operable to provide at least one of vertical thrust, horizontal thrust, and attitude control propulsion in pitch, roll, or yaw. In some cases, the propulsion element of the system includes an electric motor operatively coupled to at least one of an aircraft-type propeller, a helicopter-type rotor, and a ducted fan.

In some cases, the optical power receiver of the system includes at least one of a photovoltaic cell, a thermophotovoltaic cell, a thermoelectric device, and a heat engine.

In some cases, the system also includes an energy storage element device operable to supply power to at least one propulsion element. In such cases, the energy storage element may include at least one of a primary battery, a secondary battery, a capacitor, a supercapacitor, and a flywheel.

In some cases, the optical power source of the system may include a laser. In these or in other cases, the optical power source of the system may include at least one of an incoherent array of diode lasers, an at least partially coherent array of diode lasers, a solid-state laser, a diode-pumped fiber laser, a disk laser, and a diode pumped alkali vapor laser.

In some cases, the system may include a tether coupled to the aerial platform. In these cases, the tether is operable to constrain the motion of the aerial platform relative to the optical power source. The tether may include at least a portion of the optical power transmission element. In addition, or in the alternative, the tether may include at least one of a strength member, a sheath, an optical communications fiber, an optical fiber for illumination, an electrical signal conductor, an electrical power conductor, and a static-dissipating conductive element. The system in at least some of these cases may further include a tether deployment mechanism operable to controllably deploy the tether and operable to controllably retract the tether.

In some cases, the system may include a base unit and a tether coupled to the base unit and to the aerial platform, and operable to constrain the motion of the aerial platform relative to the base unit.

In some cases, the system may include a controller operable to maintain the aerial platform in stable flight. In these cases, during flight of the aerial platform, the controller may also be operable to automatically control at least one of altitude, position (relative to the optical power source), pitch angle, roll angle, yaw angle, velocity, flight path, and tension on a tether coupled to the aerial platform during flight.

In some cases, the system may include a safety system operable to detect an unsafe condition. In these cases, the safety system may include a laser operable to detect an unsafe condition, and in response to detecting the unsafe condition, the safety system may prevent the emission of optical power from the optical power source.

In a second embodiment, a method for operating an aerial platform includes transmitting, via an optical transmission element, optical power from an optical power source to an optical power receiver attached to an aerial platform, converting at least a portion of the optical power received by the optical power receiver into a form of power usable by a propulsion element to propel the aerial platform, supplying the converted power to the propulsion element, and propelling the aerial platform with the converted power consumed by propulsion element.

In some cases of the method, propelling the aerial platform includes at least one of producing vertical thrust, producing horizontal thrust, and producing attitude control torque about an axis of the platform.

In some cases of the method, converting at least a portion of the optical power includes converting at least a portion of the optical power into electrical power.

In some cases of the method, supplying the converted power includes supplying power from an energy storage element. In some of these cases, the method of supplying power from an energy storage element includes limiting the amount of energy stored in the energy storage element such that the stored amount does not provide the propulsion element enough power to propel the aerial platform beyond a specified flight envelope while the receiver does not receive optical power. In some of these cases, the method of supplying power from an energy storage element includes limiting the maximum amount of power that can be supplied by the energy storage element, such that the provided amount of power does not provide the propulsion element enough power to propel the aerial platform beyond a specified flight envelope while the receiver does not receive optical power.

In some cases, the method further includes automatically controlling at least one of altitude of the aerial platform during flight, position, relative to the optical power source, of the aerial platform during flight, pitch angle of the aerial platform during flight, roll angle of the aerial platform during flight, yaw angle of the aerial platform during flight, velocity of the aerial platform during flight, flight path of the aerial platform during flight, and tension on a tether coupled to the aerial platform during flight.

In some cases, the method includes detecting an unsafe condition and automatically performing, in response to detecting the unsafe condition, at least one of landing the aerial platform, stopping the emission of optical power from the optical power source, detaching an end of a tether from a point of attachment, severing a tether, and notifying a user.

BRIEF DESCRIPTION OF THE FIGURES

FIG. 2 includes five schematic views, each illustrating a configuration of the system's aerial platform according to an embodiment of the invention.

DETAILED DESCRIPTION

Figure 1:
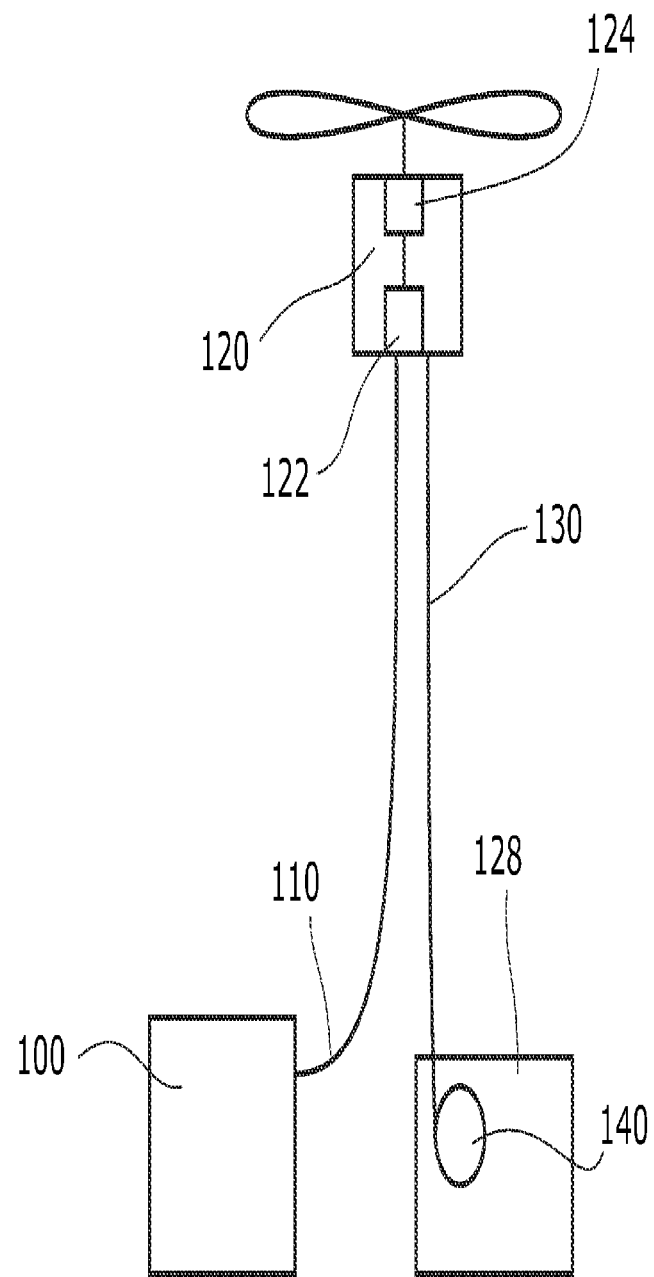
FIG. 1 is a block diagram illustrating an aerial platform system, according to an embodiment of the invention.

FIG. 1 is a block diagram of a system 90 for an aerial platform according to an embodiment of the invention. The system 90 comprises an optical power source 100 coupled to an end of an optical power transmission element 110. Another end of the power transmission element 110 is coupled to an aerial platform 120 of the system 90. The optical power source 100 is operable to transmit optical power to the aerial platform 120 through the optical power transmission element 110. The aerial platform 120 comprises an optical power receiver 122, which is operable to convert at least a portion of the transmitted optical power into a second form of power, such as electric power. The aerial platform 120 further comprises at least one propulsion element 124, which converts at least some of the second form of power into a propulsive force (thrust) on the aerial platform. The aerial platform 120 is thus able to operate the propulsion element 124, and therefore remain aloft in controlled flight, as long as the optical power source is operational.

The optical power source 100 is located away from the platform 120 and often on the ground under the platform 120 while the platform 120 hovers. By providing power for the propulsion element 124 from the optical power source 100 located away from the platform 120, the platform 120 can remain aloft for long periods.

In some embodiments, the system 90 may further include a base unit 128 and a tether 130. The tether 130 may be coupled to the base unit 128 and to the aerial platform 120, and may be operable to constrain the range of motion of the aerial platform 120 relative to the optical power source 100. In some embodiments, a portion of the optical transmission element 110 may be associated with the tether 130, i.e., either a portion of the element 110 comprises the entire tether 130, or a portion of the element 110 comprises a component of the tether 130, or a portion of the element 110 is physically coupled to the tether 130 so that it extends substantially parallel to the tether 130.

In some embodiments, the system 90 may further comprise a deployment mechanism 140 (here shown as a drum or reel) attached to the base unit 128 and operable to deploy the tether 130 as the aerial platform 120 takes off or climbs, In this and other embodiments the deployment mechanism 140 may be operable to reel the tether 130 back in when the platform 120 descends.

It is possible that some embodiments of the system 90 may not include a deployment mechanism, for example by simply laying an optical fiber or other optical power transmission element out on the ground and allowing the aerial platform 120 to pull the fiber up as it ascends, and similarly allowing the slack fiber to accumulate on the ground as the platform 120 descends. However, in most circumstances, it will be desirable to have a deployment mechanism 140 which can store the tether 130 and optical transmission element 110 in a compact form, deploy it in a controlled manner, and possibly also retract and re-store the tether 130 and optical transmission element 110 when the platform 120 returns to the base unit 128.

In some embodiments, the deployment mechanism 140 may comprise a cylindrical element rotatable about an axis, such as a drum, spool, or reel. Various methods and devices known in the art may be used to deploy the tether from a drum in a controlled fashion (e.g., keeping the tether under a constant tension, or within an allowed range of tensions, or deploying at a constant velocity) and, optionally, to stop the deployment after a desired length of tether has been deployed. Similarly, various methods and devices known in the art may be used to actively or passively control a drum while the platform is aloft, for example to maintain a constant tension on the tether or to vary the platform altitude. Furthermore, in some embodiments, various known devices and methods may be used to rewind the tether onto the spool in a controlled fashion as the aerial platform descends while for example, maintaining a constant rate of descent, or keeping the tension on the tether within an allowed range, and optionally while also controlling the winding of the tether on the drum (e.g., to form evenly-wound layers or to control the tension of the tether on the drum) so the tether can be re-used.

In other embodiments, the deployment mechanism 140 may not rewind the tether 130 as the aerial platform 120 descends; the tether 130 may simply accumulate in an uncontrolled pile on the ground as the aerial platform 120 descends, and be re-spooled at a later time. In still other embodiments, the deployment mechanism 140 may not rewind the tether 130 at all; the tether 130 may detach from the deployment mechanism 140 (and the aerial platform), and either be thrown away, or be recovered manually.

In embodiments where the tether 130 is stored on a rotating assembly such as a drum, the optical power may be transferred from the non-rotating transmitter to the rotating assembly via an optical rotary coupling. Alternatively, the laser (or other optical power source) may be mounted on, and rotate with, the drum; in such cases power and cooling fluid (if needed) may be supplied to the laser via electrical and fluid rotary coupling.

In some embodiments, the bulk of the tether 130 may be stored as a coil wound on a stationary hub or spool. The tether 130 may deploy from, and retract back into, the coil directly, in the fashion of a Slinky toy or coiled telephone cord. Alternatively, the tether 130 may be fed out from the coil by a mechanism such as a rotating arm. In some embodiments, such a mechanism may be operable to maintain a desired tension on the tether 130. In some embodiments, such a mechanism may be operable to retrieve the tether and rewind it onto the coil or spool.

In some embodiments, the deployment mechanism 140 may be located on the aerial platform 120 rather than on or near the base unit 128. In some embodiments, the tether and its hub, spool, drum, reel or other support may comprise a replaceable tether assembly. Many other arrangements for storing, deploying, and retrieving the tether are possible. For example, the tether may be wound around two hubs in a figure-8 pattern to minimize twisting of the tether as it is deployed. In some embodiments, the deployment mechanism 140 may measure the length of the deployed section of tether as it is deployed.

Still referring to FIG. 1, the system 90 may be configured to be easily transportable when not in use. For example, in some embodiments an aerial platform 120 and an associated base unit 128 and tether deployment mechanism 140 may be configured to fit in a single container for transport, eliminating the need to disconnect and reconnect the aerial platform 120 from the tether 130. In some embodiments, the optical power source 100, controller, user interface, or other components may be physically contained in the base unit 128, so that the system comprises fewer physically-separate components. In some embodiments, the entire system 90 may be configured to fit in a single container for transport. In some embodiments, the system 90 may be configured to be transported in one or more containers such that each container has a loaded gross weight less than the maximum weight for a particular mode of transportation; for example, each container may be safely carried by two people.

An example of an operating scenario for the system 90 follows. The system 90, with the aerial platform 120 attached to the tether 130 and the tether 130 fully reeled into the deployment mechanism 140, is transported to a site requiring an elevated platform. For example, a military base may need to elevate a surveillance camera to monitor the surrounding terrain, or a news agency may require an overhead view of a sporting event, or a disaster relief operation may require a signal repeater some distance above the ground to relay radio communications. The deployment mechanism 140 and optical power source 100 are connected to a power source (not shown), and to a communications network (also not shown) to allow the system 90 to be controlled remotely. An appropriate payload is attached to the aerial platform 120. The optical power source 100 is turned on to allow the optical power source 100 to receive power (not shown) and generate optical power for the platform 120. After converting the optical power to a form that the propulsion element can use to generate thrust, the platform 120 then takes off and ascends vertically to a desired height, such as a few hundred feet. The platform 120 then enters a stable hovering mode, and hovers at a constant altitude and an approximately fixed position, for as long as desired, such as hours or days. The platform 120 may hover for any desired duration, and return at the end of the duration, or in the event of a mechanical failure, severe weather, or other exceptional condition.

Still referring to FIG. 1, the optical power source 100 may produce light at any desired wavelength, or in any desired range of wavelengths, which can be transmitted via the optical power transmission element 110. In various embodiments, this includes at least ultraviolet light, visible light, and infrared light. However, wavelengths in the near-infrared range, generally between 0.7 and 1.6 microns, may be desired because they can be transmitted with low loss via commonly-available glass-core optical fibers.

In some embodiments, the optical power source 100 may comprise a laser. Many types of lasers are known in the art, and new types of lasers are continually being developed; therefore, no single type of laser is preferred or excluded as an optical power source. However, the following types of laser systems emit in the near-infrared wavelength range and are capable of producing high average power levels (greater than 100 watts) for long periods of time: Solid state lasers, diode-pumped fiber lasers, disk lasers, diode-pumped alkali (DPAL) lasers, and diode laser arrays. Diode laser arrays may be incoherent, partially coherent, and fully coherent arrays. Of these laser types, incoherent diode laser arrays are the most efficient, and are commercially available at power levels from a few watts to greater than 10 kW.

In some embodiments, the optical power source 100 may comprise a non-laser light source, for example an arc lamp or an array of light-emitting diodes (LEDs).

Still referring to FIG. 1, the optical power transmission element 110 may comprise any desired means for transmitting optical power along a confined, non-line-of-sight path. In some embodiments, the optical power transmission element may comprise at least one optical fiber, for example a multi-mode glass optical fiber such as Corning® ClearCurve® Multimode Large Core Specialty Optical Fiber. However, the transmission element 110 may comprise other optical fibers, such as photonic crystal fiber, graded-index glass fiber, plastic optical fiber, or hollow reflective-walled waveguide.

In some embodiments, the optical power transmission element 110 may comprise two or more segments; for example, one segment transmitting light from an optical power source to an end of a tether, a second segment extending the length of the tether, and a third segment extending from another end of the tether to an optical power receiver.

Still referring to FIG. 1, the optical power receiver 122 may comprise one or more photovoltaic (PV) cells operable to convert optical power directly to electrical power. In some embodiments, suitable PV cells, optimized for high intensity and for operation with monochromatic light, are available from several manufacturers, including Spectrolab, Inc. and Spire Semiconductor. Suitable PV cells may be fabricated from silicon, gallium arsenide, or a variety of other materials known in the art. Photovoltaic cells may convert monochromatic (i.e., single-wavelength) optical power to electrical power with an efficiency of 50% or higher (as contrasted with photovoltaic conversion of sunlight to electricity, which is much less efficient). Optical power not converted to electricity by PV cells may be converted to waste heat in the receiver, although some may be reflected back to the optical power source 100.

In some embodiments, the receiver 122 may include electrical conversion elements, such as transformers, rectifiers, filters, DC to DC voltage converters, and DC to AC inverters. The receiver 122 may be configured to also supply power to non-propulsive elements on the aerial platform 120, such as controllers, sensors, payloads, and communications devices.

In other embodiments the receiver 122 may convert optical power into mechanical power, for example by using a Stirling-cycle engine, Brayton-cycle engine, or other heat engine. Mechanical power may then be used directly to drive the propulsion element 124, or may be converted to electrical power, for example by a generator (not shown). In still other embodiments, the receiver may use another means of converting optical power to electrical power, such as thermophotovoltaic (TPV) cells, thermoelectric devices, or optical rectennas.

The preceding discussion has described the optical power as being in the ultraviolet, visible, or infrared portions of the electromagnetic spectrum. However, in other embodiments, at least some of the power transmitted from the power source 100 to the power receiver 122 may be in the form of electromagnetic radiation at other wavelengths ($\lambda$), such as microwaves ($\lambda$ of about 1-10 cm), millimeter waves ($\lambda$ of about 0.1-1 cm) or submillimeter-wave radiation. The power source 100 may be a microwave source. Examples of microwave sources include a solid-state oscillator, a klystron, a magnetron, and a gyrotron. The optical transmission element 110 may be replaced by an alternative transmission element, for example, a hollow metallic waveguide, a dielectric waveguide, or a coaxial transmission line. In some embodiments, the receiver 122 may convert the received power to electric power using a rectifier or rectenna, or may convert the received power to heat which may drive, for example, a heat engine or thermoelectric device.

FIG. 2 includes five schematic views, each illustrating a configuration of the system's aerial platform according to an embodiment of the invention.

The aerial platform 100 may have the general configuration of any desired type of controllable aircraft. For example, in various embodiments the platform 120 may include a VTOL (vertical take-off and landing) aircraft, a single-rotor helicopter, a multi-rotor helicopter, a fixed wing aircraft, a blimp, or a dirigible. The aerial platform 120 may remain aloft by any means, including aerodynamic lift (i.e., wing lift), buoyant lift, vertical thrust, or any combination thereof.

FIG. 2A shows a platform 200 based on a "quad-rotor" or "quadrocopter" UAV, a configuration commonly used for small, highly maneuverable UAVs, according to an embodiment of the invention. Quadrocopters are VTOL UAVs, i.e., they take off and land vertically, and are able to hover without moving horizontally. The quadrocopter 200 may be similar to, for example, the Pelican quadrocopter manufactured by Ascending Technologies, Inc., which weighs approximately 1 kilogram and consumes approximately 200 watts of power when hovering. The quadrocopter 200 has four propulsion elements 202, each comprising an electric motor 204 and a simple fixed-pitch rotor (a propeller) 206 rotating around a vertical axis to produce vertical thrust. By varying the power delivered to each propulsion element 202, the quadrocopter 200 is able to climb or descend, to tilt (roll or pitch), and to rotate around its axis (yaw). Similar platforms may have from three to eight or more rotors. In some embodiments, a quadrocopter 200 or similar platform may be symmetric about a central axis, allowing a tether to be attached at the center of symmetry.

FIG. 2B shows a platform 210 based on a single-rotor helicopter, according to an embodiment of the invention.

FIG. 2C shows a platform 220 based on a fixed-wing airplane, according to an embodiment of the invention. This type of platform cannot hover in one position, but can fly in a repeating pattern such as a circle or racetrack pattern, allowing it to remain attached to a tether. This platform 220 illustrates an embodiment in which the propulsion element 222 produces horizontal thrust, with the platform 220 employing aerodynamic lift to remain aloft.

FIG. 2D shows a platform 230 based on an aerostat (i.e., a tethered lighter-than-air platform), according to an embodiment of the invention. FIG. 2D shows an example of an embodiment where the propulsion elements 232 are ducted fans, which can be rotated to produce any combination of horizontal and vertical thrust. FIG. 2D also illustrates an embodiment where the propulsion elements 232 do not necessarily contribute to lifting the platform (i.e., all the lift may be provided by the gasbag 234), but may provide thrust to counter wind loads or variations in lift. FIG. 2D also illustrates an embodiment where the tether 236 may not be attached at or near the center of gravity or the center of pressure of the platform (i.e., the tether is attached to the nose of the gasbag, which minimizes wind-induced pitching of the platform). FIG. 2D also illustrates an embodiment where the optical power transmission element 238 separates from the tether 236 at some distance from the tether attachment point.

FIG. 2E shows a platform 240 which is a hybrid of an aerostat and a multi-rotor helicopter, according to an embodiment of the invention. Embodiments of this type, in which a portion of the platform 240's lift comes from the buoyancy of a gasbag 242, and a portion from propulsive elements 244, may provide advantageous combinations of payload capacity and controllability.

The platform configurations illustrated in FIG. 2 are not intended to be comprehensive, and many other configurations may be employed by those skilled in the art. Some embodiments may include propulsion elements of types not illustrated, for example, mechanically-driven rotors coupled to a heat-engine receiver, or electrostatic or "ion wind" thrusters.

FIG. 3 includes three schematic views, each illustrating a configuration of the system's tether and optical power transmission element according to an embodiment of the invention.

Figure 3A:
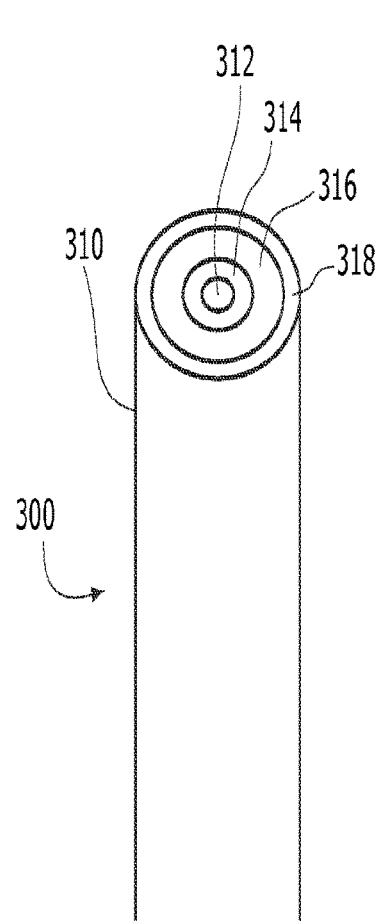
FIG. 3 includes three schematic views, each illustrating a configuration of the system's tether and optical power transmission element according to an embodiment of the invention.

Referring to FIG. 3A, in some embodiments, the body of the tether 300 (i.e., the portion of the tether that does not include any connectors, splices, or other special elements) may consist solely of an optical fiber 310. An optical fiber typically comprises a core 312, a cladding layer 314, a buffer layer 316, and a jacket 318, but other configurations are possible.

Figure 3B:
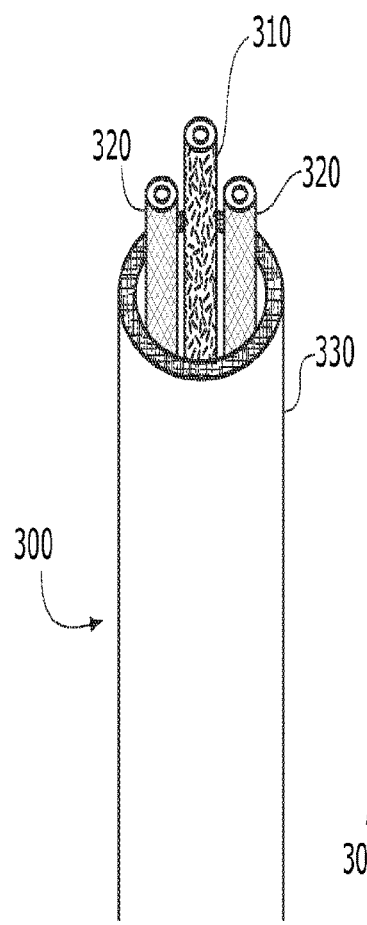

Referring to FIG. 3B the tether 300 may include a strength member 320. For example in this and other embodiments, the strength member 320 includes a high-tensile-strength thread, cord, or braid. The strength member 320 may be composed of, without limitation, polymers such as Spectra or Kevlar, carbon fiber material, or glass fiber material. Multiple strength members may be used, as shown in the figure, to minimize asymmetric forces on the tether. In yet other embodiments, the body of the tether 300 may also include an outer sheath 330 for protection against abrasion, mechanical damage, or water intrusion.

Figure 3C:
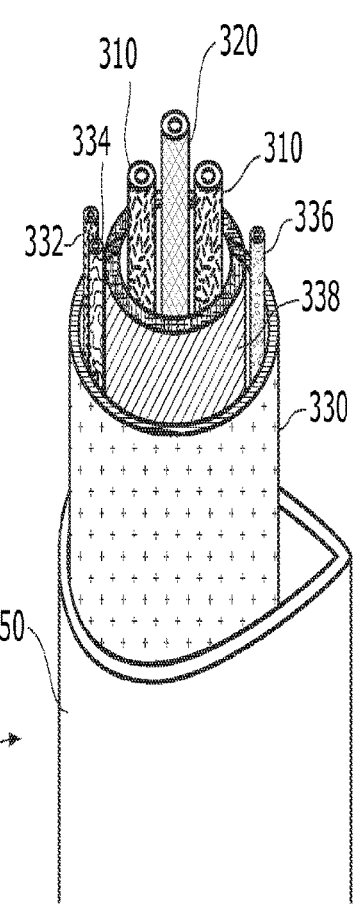

Referring to FIG. 3C, the tether 300 may include various other components for transmitting either signals or power. For example, in this and other embodiments, the tether 300 includes metallic wires 332, coaxial cables 334, and optical fibers 310 and 336.

In some embodiments, the tether 300 may include various other elements which provide desirable mechanical, electrical, or optical properties. For example, either the entire tether, or a portion of the tether which includes an optical power transmission element, may be surrounded by an optical safety sheath 338, which is opaque to the optical power transmission wavelength and resistant to damage by optical power.

The tether 300 may also comprise a component that may be slightly conductive over part or all of its length to dissipate static charges without carrying hazardous currents. Such a conductive component may have a resistance of, for example, 1 megohm/meter.

It may be desirable for the tether 300 to have low transverse aerodynamic (wind) drag. In such situations, the body of the tether 300 may be shaped to minimize wind drag, for example by shaping it to an airfoil cross section or texturing its outer surface. The tether 300 may include separate drag-reduction features, such as outer shell segment 350 able to pivot around the tether axis, and having an airfoil cross section.

In some embodiments, the tether 300 may include a connector (not shown) on an end to mechanically connect the tether to the deployment mechanism. A connector may be operable to optically couple one section of an optical power transmission element to another section. A connector may be further operable to couple other elements of a tether to corresponding elements in a mating connector, for example, coupling optical signal fibers or electrical conductors.

In some embodiments, the tether 300 may include a connector (also not shown) on another end to mechanically connect the tether 300 to the aerial platform 120 (FIG. 1). A connector may be operable to optically couple the optical power transmission element 110 (FIG. 1) to the optical power receiver 122 (FIG. 1). A connector may be further operable to couple other elements of the tether 300 to corresponding elements on the aerial platform 120; for example, to connect optical signal fibers to an optical communications element. The connectors on the respective ends may be similar, or may be complementary, i.e., male and female versions of the same connector. Alternatively, they may be different; for example, a connector operable to connect to the aerial platform 120 may be lighter in weight than a connector operable to connect to the base station.

Connectors may be configured to be connected and disconnected by a user of the system, for example to replace a damaged tether or to switch between two or more types of tether, or may be configured to be connected and disconnected only by specific personnel, or under specific conditions, such as in a clean room.

In some embodiments, the connectors may be configured such that two or more lengths of tether can be connected together, either temporarily or permanently, to form a longer tether. The connectors may be complementary (i.e., male on one end of a tether, and female on another end), or a junction or adapter may be used at the point of connection. Allowing multiple tether segments to be connected together allows segments to be removed and replaced by the user in case of failure or damage, without replacing the entire tether, and may allow the tether length to be varied by adding or removing tether segments.

A tether 300 may include a tap at a point other than at an end of the tether 300 or tether segment (not shown). A tap may provide an anchor point for a payload separate from the aerial platform, e.g., at a different altitude. A tap may also provide access to one or more tether elements, such as power or signal transmitting elements, which may be used by such a separate payload.

In some embodiments, two or more tethers may run substantially parallel over part of or all of their length. Parallel tethers may be bound together either continuously, e.g., by a removable jacket, or at intervals along their length, e.g., by Velcro straps, cable ties, or other similar mechanisms. Parallel tethers may comprise different combinations of strength members, power conductors, and signal conductors, such that different combinations of tethers can be assembled to form a desired configuration of tether components.

Figure 4:
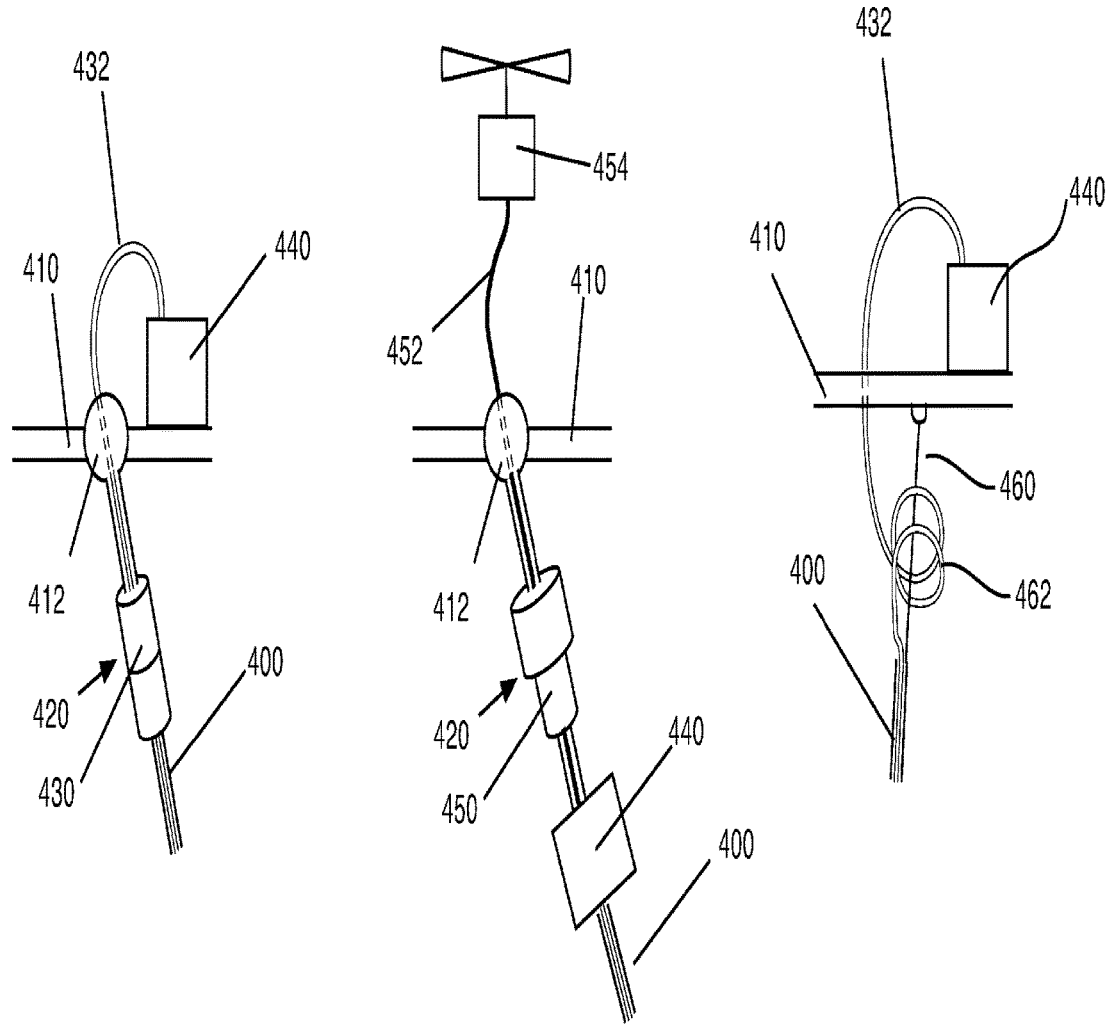
FIG. 4 includes three schematic views, each illustrating a configuration of the system's tether-platform connection according to an embodiment of the invention.

Referring now to FIG. 4, the means of attachment between a tether 400 and aerial platform 410 is important because the tether 400 may exert substantial forces on the platform 410. In many cases, it may be desirable to attach the tether 400 in a fashion such that tension in the tether 400 will not apply substantial torque to the platform 410. In some cases, it may be desirable to attach the tether 400 in a fashion which results in torque about an axis, in at least some conditions, while avoiding torque on another axis. For example, as shown in FIG. 2D, it may be desirable to attach a tether 400 to an aerostat at a point offset from the aerostat's center of gravity, but forward of, and aligned with, the aerostat's center of pressure, so that wind loads will tend to keep the aerostat in a fixed orientation relative to the wind. (This is commonly seen in mechanically-tethered blimps, where the tether is attached to the nose of the blimp.)

In some embodiments, the tether 400 may be mechanically coupled to the aerial platform 410 at or near the center of gravity of the platform 410 so that the tether tension will not exert substantial torque on the platform pitch or roll axes.

FIG. 4 includes three schematic views, each illustrating a configuration of the system's tether-platform connection according to an embodiment of the invention. In some embodiments, a ball joint 412, or a gimbal or other similar rotatable attachment may be used between the tether 400 and the aerial platform 410, so that the tether tension will not cause a sharp bend in the tether 400 or apply torque to the point of attachment. Further, in some embodiments, a rotary joint 420 may be used so that the platform 120 can rotate freely without twisting the tether 130.

Referring to FIG. 4A, In some embodiments, the rotary joint 420 may comprise a rotary optical coupler 430 operable to transmit optical power through the joint. A section of the optical power transfer element 432 extends from the rotary optical coupler 430 through the ball joint 412 to the optical power receiver 440 Alternatively, in other embodiments, an optical power receiver 440 or other platform elements may be located on the tether side of the rotary joint 420, as shown in FIG. 4B, and the rotary joint may comprise a rotary transformer or electrical slip ring 450 operable to transfer electrical power or signals across the joint to electrical conductors 452, which may then be coupled to, for example, a propulsion unit 454.

In still other embodiments, the tether 400 may be attached to the platform via a flexible strength member 460, and one or more tether components, including an optical power transmission element, may be formed into a loop or coil 462 to accommodate motion of the tether 400 relative to the aerial platform 410 including at least some range of rotation of the platform 410 around the tether axis, as shown in FIG. 4C.

Figure 5:
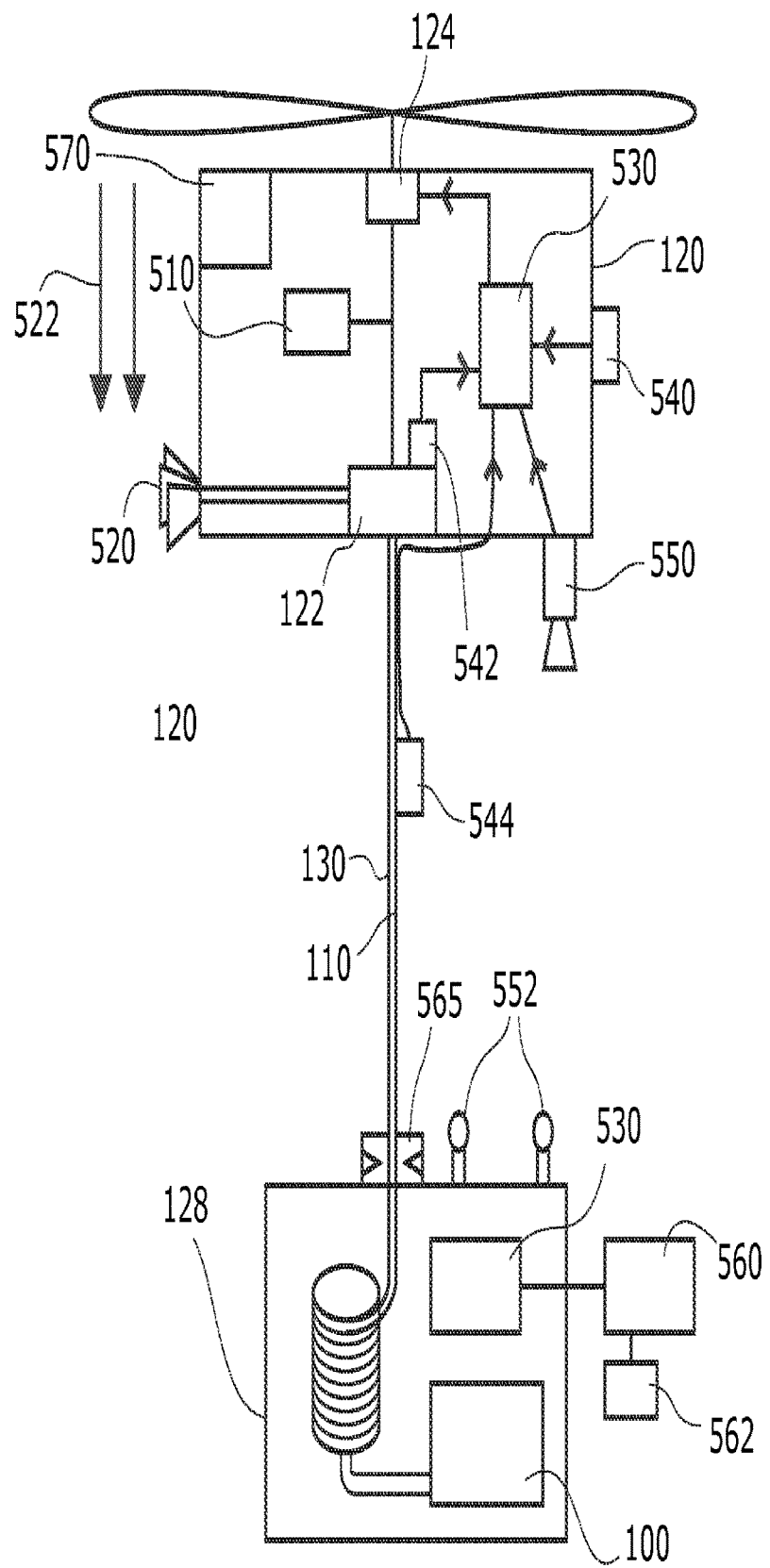
FIG. 5 is a block diagram of an aerial platform system, according to another embodiment of the invention.

FIG. 5 is a block diagram of aerial platform system 500, according to another embodiment of the invention.

The system 500 may include any desired energy storage element 510. For example, in this and other embodiments, the energy storage element includes a battery disposed on the aerial platform 120. The energy storage element 510 may be configured to supply additional power to a propulsion element 124 if extra propulsive power (beyond that provided by the receiver 122) is needed, for example during take-off, or to handle wind gusts. The energy storage element may also be configured to provide temporary power if power from the receiver 122 is not available. Power from the receiver 122 may be unavailable due to a failure of the optical transmission element 110 due to damage to or breakage of the tether 130, or due to a deliberate interruption. For example, a user may turn off the optical power source 100 briefly in order to connect the optical power source 100 to a different power source, or to insert an additional segment into a multi-segment tether.

In some embodiments, the energy storage element 510 may store sufficient energy to allow the platform to descend and land safely if power from the receiver 122 is interrupted.

In some embodiments, the energy storage element 510 may comprise a primary (i.e., non-rechargeable) power source, such as a primary battery. In some embodiments, the energy storage element 510 may comprise a rechargeable device, for example, a rechargeable battery, a capacitor, or a flywheel. If an energy storage element 510 includes a rechargeable device, the system 500 may be configured to allow power from the receiver 122 to charge the rechargeable device.

Still referring to FIG. 5, in some embodiments the energy storage element 510 may be deliberately limited in the amount of energy that it can store or the amount of power that it can provide so that the aerial platform 120 cannot exceed a specified flight envelope if the tether 130 is cut. A specified flight envelope may include limits on altitude, position, velocity, flight duration, or other flight parameters, or any combination of these parameters. In particular, an energy storage element 510 may be configured such that if the tether 130 is cut, the aerial platform 120 must descend to the ground within a limited time, for example within 30 seconds. This would reduce the possible hazard of an uncontrolled, untethered flying object, particularly to aircraft.

In some embodiments, the platform 120 may incorporate means to remove waste heat from the receiver 122. The means to remove waste heat may include a fin or radiator 520 thermally coupled to the optical power receiver 122 and located in an airstream 522 produced by the operation of a propulsion element 124.

Still referring to FIG. 5, the system 500 may comprise a controller 530. As is known in the art, the functions ascribed here to one controller may be implemented in two or more physically or functionally separate controllers. In particular, some functions may be implemented by hardware or software located on the aerial platform 120, while other functions may be implemented by hardware or software located in or near the base unit 580, and still other functions may be performed remotely, e.g., by a computer communicating with the system over the internet.

In some embodiments, the controller 530 receives input from one or more sensors 540 mounted on the aerial platform 120. Sensors 540 may include guidance and navigation sensors similar to those found on free-flying UAVs. Examples of such sensors include accelerometers, gyroscopes, Inertial Measurement Units (IMUS), Global Positioning System (GPS) receivers, differential GPS receivers, and altimeters. Sensors 540 may also include sensors responsive to various aspects of the platform's operation, for example, sensors for optical irradiance, voltage, current, temperature, force, or RPM.

In some embodiments, the controller 530 receives input from one or more sensors 542 responsive to various other aspects of the system's operation. Examples of such sensors 542 include optical power output sensors for the optical power source 100, and tether tension sensors for the deployment mechanism.

In some embodiments, the controller 530 may receive input from sensor 544, such as wind speed sensors, attached to the tether 130.

In some embodiments, a sensor 550 on the airborne platform 120 may be responsive to a signal emitted from a remote device on or near the base unit 580. For example, the sensor 550 may include a camera which detects one or more optical beacons 552 on the ground near the base unit 580; the controller 530 may use the camera images to determine the position and orientation of the platform 120 relative to the beacons 552. As another example, the platform 120 may include one or more microphones (not shown) which detect ultrasonic pulses emitted from an acoustic source (not shown) on the base unit; the controller 530 may use the time delay between the emission of a pulse and its detection at the various microphone positions to determine the position and orientation of the aerial platform 120 relative to the base unit 580.

Similarly, a sensor (not shown) located on or near the base unit 580 may be responsive to a signal emitted from the aerial platform 120.

In some embodiments, the controller 530 may receive inputs from a user of the system 500. User inputs may be received via a user interface 560, comprising switches, keypads, touchscreens, or similar components. User input may also be received via a connection to a communications network (not shown).

The controller 530 may control the operation of the propulsion element 124, as well as the operation of other devices on the aerial platform 120, including actuators (not shown) for flight control devices such as rudders or elevators. The controller 530 may, responsive to input from the one or more sensors, activate the propulsion element 124 and other devices to maintain the aerial platform 120 in stable flight. The controller 530 may further be configured to control the aerial platform 120 to maintain a desired position and orientation, or sequence of positions and orientations, or to follow a desired flight path.

In particular, the controller 530 may be configured to accept simple commands or settings, and automatically "fly" the platform 120 without user intervention for an indefinite period of time. For example, in a system using a VTOL aerial platform, the controller 530 may be given a flight altitude, a heading, and a "start" command, and automatically control the aerial platform 120 to take off from the ground, ascend vertically to the specified altitude, rotate to the specified heading, and then hold its position directly above the base unit 580 until the controller 530 receives a command to land the platform 120. In a system using a fixed-wing aerial platform, the controller 530 may control the launching of the platform from a catapult, and may guide the platform to fly a circular flight path (or another repeating path such as a figure-8) over the base unit 128.

The controller 530 may also control the operation of optical power source 100, deployment mechanism, and other ground equipment. For example, the controller 530 may vary the power output of a laser source in response to factors such as the instantaneous power needed by the aerial platform 120, the temperature of the optical power receiver 122, and the state of charge of the energy storage device 510. In another example, the controller 530 may control the deployed tether length, and tether tension automatically to keep the platform 120 flying stably in varying wind or weather conditions.

Still referring to FIG. 5, the system 500 may include a user interaction element 562, which is operable to assist the user in operating the system 500 and in planning future operations. The user interaction element may, for example, make use of stored data such as tether weight per unit length, to predict the maximum altitude at which the aerial platform can safely fly with a particular payload, and display that information to the user. In some embodiments, the user interaction element may also make use of sensor data, such as wind speed and temperature measurements, in making calculations.

Figures 6A, 6B:
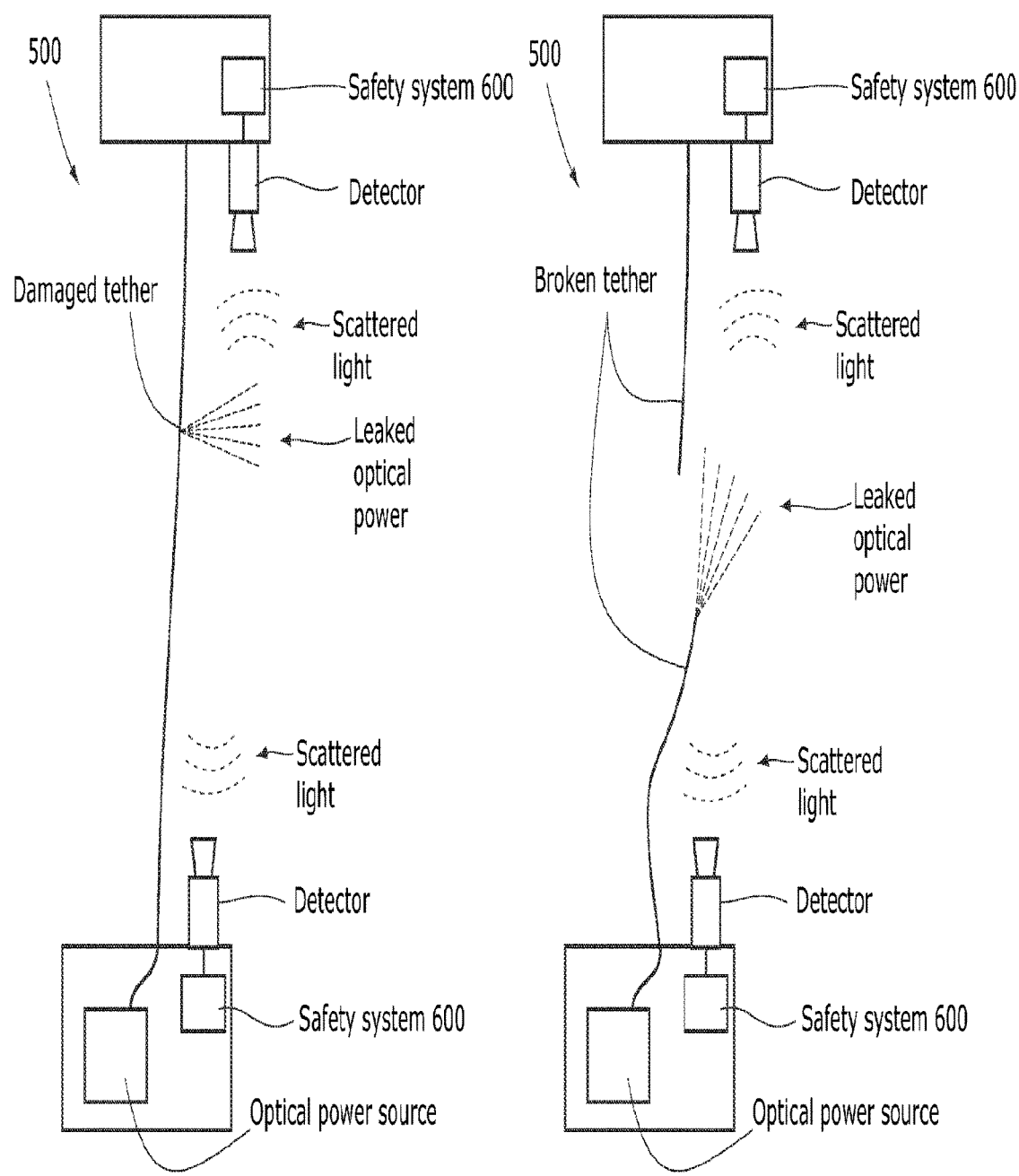
FIG. 6 is a schematic view of a safety system component of the aerial platform system, according to an embodiment of the invention.

Referring to FIGS. 5 and 6, the system 500 may include a safety system 600, to detect one or more unsafe conditions and provide a warning to a user. In some embodiments, the safety system 600 may be implemented as part of the controller 530. In some embodiments, the safety system 600 may also perform an action in response to detecting an unsafe condition. For example, the safety system may respond to an unsafe condition by causing the aerial platform 120 to return to the base unit and land immediately.

An unsafe condition may include an unsafe external condition, such as excessive wind speed or wind gusts. An unsafe condition may include an unsafe operating condition, such as operating the platform 120 at an altitude that is too high or too low, operating the platform 120 at an excessive velocity or in an unsafe orientation, or operating with insufficient stored energy for a safe landing. An unsafe condition may include a hardware fault, such as a break in the tether, or a software fault. In some cases, an unsafe condition may include a condition which is not immediately hazardous but which indicates an increased risk of failure, for example, a motor which is progressively overheating but has not yet failed.

In some embodiments, the safety system may include a laser safety element. The laser safety element may be configured to comply with one or more mandatory or recommended laser safety procedures, for example as documented in ANSI laser safety standard ANSI Z136, or in corresponding international safety standard documents. The laser safety element may be configured to prevent the emission of optical power from an optical power source if an unsafe condition is detected.

In some embodiments, a laser safety element may comprise a detector operable to detect light emitted from the exterior of some part of the system. In particular, the safety system 600 may comprise a detector configured to detect light at a laser wavelength that is emitted from a damaged or severed tether and scattered toward the detector by the surrounding atmosphere. This type of laser safety detector is illustrated in FIG. 6.

Other safety elements may employ technologies known in the art, such as optical time domain reflectometry (OTDR) or reflected power measurements, to detect damage to the optical transmission element 110 in the tether.

In some embodiments, the system 500 may include an emergency disconnect mechanism 565 operable to rapidly detach or cut the tether. An emergency disconnect mechanism may be activated by a safety element upon detection of an unsafe condition, or it may be activated by a user action, for example by pushing a button. Emergency disconnect mechanisms may be located at the base unit or on the aerial platform. As an example, an emergency disconnect mechanism might be activated by the user if the tether made contact with a power line; an emergency disconnect might be activated by a safety element if an excessively high level of tension was detected in the tether, to prevent the tether from damaging the base unit or the aerial platform.

Referring to FIG. 5, the aerial platform 120 may carry a payload 570, that may be any desired payload. For example, in this and other embodiments, the payload 570 comprises one or more imaging devices. An imaging device may be operable to collect, for example, still images, video, stereo images, multispectral images, hyperspectral images, or three-dimensional images. Imaging devices may operate in the visible, infrared (IR), or another part of the electromagnetic spectrum. The payload 570 may comprise one or more non-imaging sensors. Non-imaging sensors may include, for example, radar system, lidar systems, motion detectors, acoustic sensors, chemical sensors, CBRN (chemical, biological, radio or nuclear) sensors, or other detectors. The payload 570 may comprise a communications or signaling payload, such as, a cellular base station, a radio transceiver, a radio repeater, or a WiFi hub. The payload 570 may comprise a passive device such as a radar reflector, optical retroreflector, or radio antenna. In other embodiments, the payload 570 may comprise an active beacon, such as a radio beacon, a radar transponder or a warning light.

The payload 570 may also comprise an illuminator, for example a searchlight or a floodlight. In some embodiments, the illuminator may comprise a light source, such as a lightbulb or LED, carried on the aerial platform 120. In other embodiments, the illuminator may comprise an optical system which receives light from a remote source and directs at least a portion of that light outward from the platform 120. For example, light from an infrared laser source located in or near the base unit may be transmitted to the payload 570 via an optical fiber in the tether 130.

In some embodiments, the payload 570 may include a gimbal (not shown). The gimbal may be operable to aim a sensor or an emitter at a target. The gimbal may be used to stabilize the payload against changes in the platform orientation, including tilts, rotations, and angular vibration. The payload 570 may comprise a beamed-power transmitter (not shown), operable to receive optical power from the optical power source 100 via the optical power transmission element 110, and to transmit at least a portion of the optical power through free space in a substantially collimated beam to a remote receiver.

Other types of payloads for UAVs or elevated platforms are known to individuals skilled in the art.

In some embodiments, payload data may be broadcast or beamed from the aerial platform directly to one or more remote users, possibly in an encrypted format. In some embodiments, the user interaction element may also be operable to allow a user to control the operation of the payload 570, or to view data or images acquired by a payload.

Figure 7:
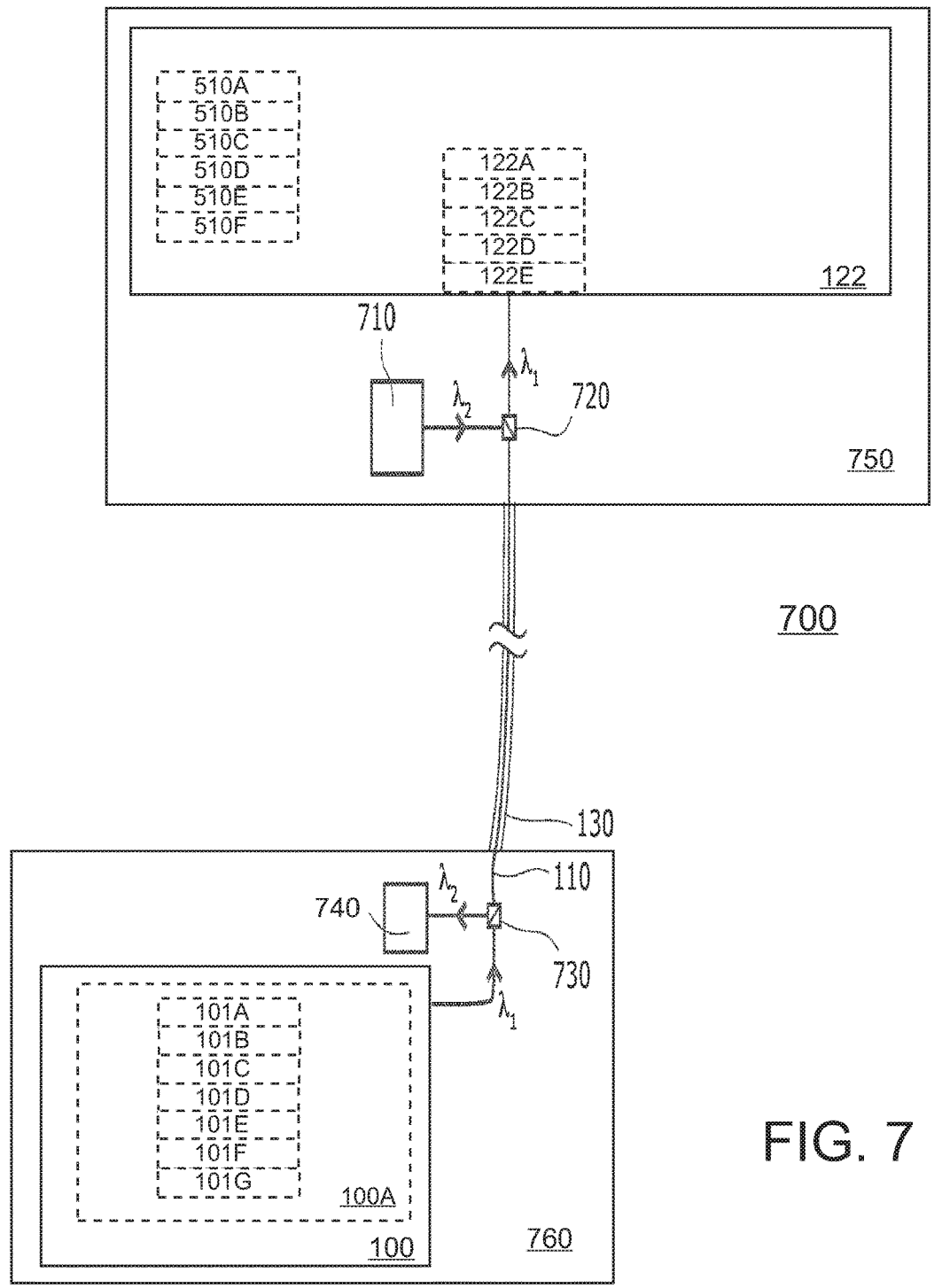
FIG. 7 is a schematic view of a data transfer component of the aerial platform system, according to another embodiment of the invention.

FIG. 7 is a schematic view of a data transfer component 700 of an aerial platform system, according to another embodiment of the invention. In some embodiments, there may be a need for the data transfer component 700 to transfer data between the aerial platform 750 and the base unit 760. In some embodiments, data may be transferred via the tether 130, such as an optical signal fiber or electrical conductor, separate from the optical power transmission element 110. In other embodiments, at least some data may be transferred via the optical power transmission element 110.

In some embodiments, light from an optical data transmitter 710 operating at a wavelength different from the optical power source 100, is coupled into the optical power transmission element 110 using a wavelength-selective element 720, which may be, for example, a dichroic mirror or a diffraction grating. The optical signal is then extracted from the optical power transmission element using a second wavelength-selective element 730, and coupled to an optical data receiver 740.

If a step-index large-core optical fiber is used for the power transmission element 110, the communications bandwidth available through the power transmission element 110 may be limited by mode dispersion (i.e., light following different paths through the element will have different delays). One means of obtaining higher bandwidth while retaining the large core diameter required for high power transmission is to use a gradient index fiber, in which the fiber refractive index varies with fiber radius in such a way that all optical paths through the fiber have similar delay.

In the schematic view of FIG. 7, an optical power source 100 is shown in a plurality of embodiments, and an optical power receiver 122 is shown in a plurality of embodiments, various ones of the embodiments being useful in one or more of the systems described herein. The optical power source 100 may comprise a laser 100A. The laser 100A may comprise at least one of an incoherent array of diode lasers 101A, an at least partially coherent array of diode lasers 101B, a solid-state laser 101C, a diode-pumped fiber laser 101D, a disk laser 101E, a diode pumped alkali vapor laser 101G, and another laser 101H. The optical power receiver 122 may comprise at least of a photovoltaic cell 122A, a thermophotovoltaic cell 122B, a thermoelectric device 122C, a heat engine 122D, and another optical power device 122E. The optical power receiver 122 may in addition, or in the alternative, include an energy storage element that comprises at least one of a primary battery 510A, a secondary battery 510B, a capacitor 510C, a supercapacitor 510D, a flywheel 510E, and another energy storage device 510F.

FIG. 8 includes three schematic views, each illustrating an aerial platform system 800 according to other embodiments of the invention. In some embodiments, the system 800 includes two or more aerial platforms 810 coupled to a single base unit 128. In some embodiments (FIG. 8A) the system 800 includes two or more aerial platforms 810 attached to a common tether 820. Such a configuration may allow an upper platform to reach a higher altitude than a single platform could reach, or to carry a heavier payload. Such a configuration may also allow two or more payloads to operate simultaneously at different altitudes or different horizontal positions. FIG. 8A also illustrates that In some embodiments, a beam splitter 826, 1:2 fiber coupler, or similar optical component may be used to divide the optical power at the lower optical platform.

In other embodiments (FIG. 8B) the system 800 includes two or more platforms attached to a tether 820 which includes a junction 832, such as a Y-junction. FIG. 8B also illustrates that one platform may receive power from one optical power source 100, while another platform receives power from a separate optical power source 100 operating at a different wavelength. In such embodiments, the optical power source 100 outputs may be combined by a wavelength-selective element 834 such as a dichroic mirror or a diffraction grating. The optical power source 100 outputs may then be separated and directed to their corresponding aerial platforms 810 by another wavelength-selective element 836.

Figure 8C:
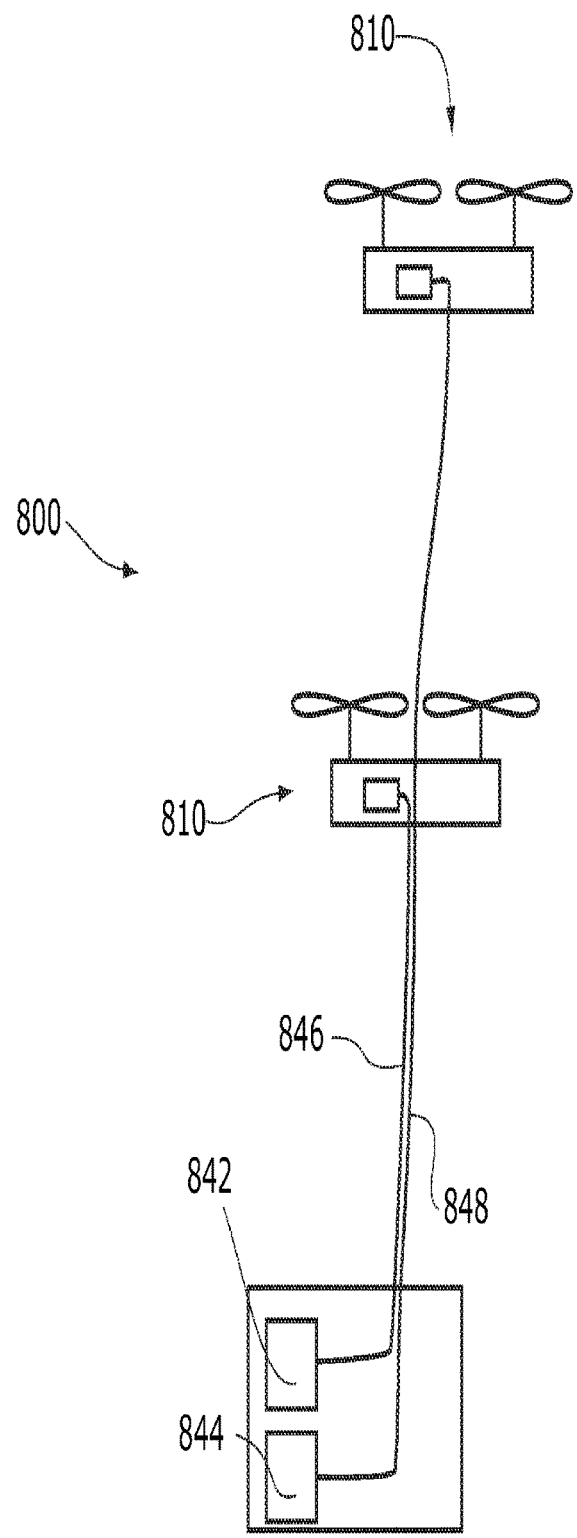
FIG. 8 includes three schematic views, each illustrating the aerial platform system according to other embodiments of the invention.

FIG. 8C illustrates an embodiment in which two aerial platforms are coupled to a common tether 840, but are coupled to separate optical power sources 842, 844 via separate optical power transmission elements 846, 848.

In some embodiments, parts of the system 800 may include features to reduce the visibility or detectability of the system 800. These features may include passive or active camouflage. The aerial platform 810 may comprise materials and employ "stealth" design principles to reduce its radar reflectivity.

Although the above discussion has generally described the system in terms of having the non-aerial components, particularly the base unit 128, stationary and located on the ground, the system is not constrained to such a configuration. In some embodiments, the non-aerial elements may be mounted on a vehicle. Examples of suitable vehicles include cars, trucks, trains, ships, submarines, and aircraft. In some embodiments the system may operate while the vehicle is in motion.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A system, comprising:
   an optical transmission element having a first end and a second end;
   an optical power source coupled to the first end of the optical transmission element and operable to transmit optical power towards the second end of the optical transmission element;
   an aerial platform;
   an energy storage device integrated with the aerial platform;
   a data transfer mechanism to pass information between the optical power source and the aerial platform;
   an optical power receiver of the aerial platform physically coupled to the second end of the optical transmission element and operable to receive at least some of the optical power produced by the optical power source, the optical power receiver further operable to convert at least a portion of the received optical power into captured electric power;
   a propulsion element of the aerial platform operable to use at least a portion of the captured electric power to propel the aerial platform; and
   at least one controller programmed to vary how much optical power is output from the optical power source based on an indication from the aerial platform, wherein the indication from the aerial platform is generated by at least one sensor circuit of the aerial platform and communicated via the data transfer mechanism, wherein the indication from the aerial platform is based on a temperature of the optical power receiver or a state of charge of the energy storage device.

2. The system of claim 1 wherein the at least one sensor circuit is a temperature sensor or a charge state sensor.

3. The system of claim 1 wherein the optical transmission element comprises at least one of the following:
   a single-mode optical fiber,
   a multimode step-index optical fiber,
   a multimode gradient-index optical fiber,
   a photonic crystal fiber, and
   a plastic optical fiber.

4. The system of claim 1 wherein the aerial platform is selected from a group, comprising:
   a fixed-wing unmanned aerial vehicle,
   a vertical-takeoff-and-landing unmanned aerial vehicle, and
   an aerostat.

5. The system of claim 1 wherein the optical power receiver comprises at least one of the following:
   a photovoltaic cell,
   a thermophotovoltaic cell,
   a thermoelectric device, and
   a heat engine.

6. The system of claim 1, wherein the energy storage device integrated with the aerial platform is operable to store captured electric power and operable to supply captured electric power to the propulsion element.

7. The system of claim 6 wherein the energy storage device comprises at least one of the following:
   a primary battery,
   a secondary battery,
   a capacitor,
   a supercapacitor, and
   a flywheel.

8. The system of claim 1 wherein the optical power source comprises at least one of the following:
   an incoherent array of diode lasers,
   an at least partially coherent array of diode lasers,
   a solid-state laser,
   a diode-pumped fiber laser,
   a disk laser, and
   a diode pumped alkali vapor laser.

9. The system of claim 1 further comprising:
   a tether coupled to the aerial platform, the tether operable to constrain motion of the aerial platform relative to the optical power source.

10. The system of claim 9, wherein the tether comprises at least a portion of the optical power transmission element.

11. The system of claim 9, wherein the tether comprises at least one of the following:
    a strength member,
    a sheath,
    an optical communications fiber,
    an optical fiber for illumination,
    an electrical signal conductor,
    an electrical power conductor, and
    a static-dissipating conductive element.

12. The system of claim 9 further comprising:
    a tether deployment mechanism operable to controllably deploy and retract the tether.

13. The system of claim 1 further comprising:
    a base unit, and
    a tether coupled to the base unit and to the aerial platform, the tether operable to constrain motion of the aerial platform relative to the base unit.

14. The system of claim 1, further comprising a controller programmed to maintain the aerial platform in stable flight, wherein to maintain the aerial platform in stable flight, the controller is programmed to automatically control at least one of the following:
    altitude of the aerial platform during flight,
    position, relative to the optical power source, of the aerial platform during flight,
    pitch angle of the aerial platform during flight,
    roll angle of the aerial platform during flight,
    yaw angle of the aerial platform during flight,
    velocity of the aerial platform during flight,
    flight path of the aerial platform during flight, tension on a tether coupled to the aerial platform during flight.

15. The system of claim 1, further comprising a safety system operable to detect an unsafe condition.

16. The system of claim 15, wherein the safety system comprises a laser-light detection apparatus operable to detect the unsafe condition, wherein the laser-light detection apparatus, in response to detecting the unsafe condition, is operable to direct a suspension of optical power emission from the optical power source.

17. A method to operate an aerial platform, the method comprising:
   transmitting, via an optical transmission element, optical power from an optical power source to an optical power receiver attached to an aerial platform;
   generating by at least one sensor circuit associated with the aerial platform an indication based on a temperature of the optical power receiver or a state of charge of an energy storage element associated with the aerial platform;
   communicating the indication generated by the at least one sensor circuit from the aerial platform to the optical power source via a data transfer mechanism;
   operating at least one controller programmed to vary how much optical power is output from the optical power source based on the indication from the aerial platform;
   converting at least a portion of the optical power received by the optical power receiver into captured energy and storing the captured energy in the energy storage element, the captured energy having a form of power usable by a propulsion element to propel the aerial platform;
   supplying captured energy to the propulsion element; and
   propelling the aerial platform with captured energy consumed by the propulsion element.

18. The method of claim 17, wherein propelling the aerial platform comprises:
   producing vertical thrust,
   producing horizontal thrust, and
   producing attitude control torque about an axis of the platform.

19. The method of claim 17, wherein the captured energy includes electrical power.

20. The method of claim 17, comprises:
   storing at least a portion of the captured energy in the energy storage element integrated with the aerial platform; and
   supplying electrical power from the energy storage element to propel the aerial platform.

21. The method of claim 20, further comprising at least one of the following:
   limiting how much captured energy is stored in the energy storage element to an amount of stored energy insufficient for the propulsion element to propel the aerial platform beyond a specified flight envelope during a time when the optical power receiver does not receive optical power, and
   limiting how much captured energy can be supplied by the energy storage element, such that a provided amount of captured energy supplied from the energy storage element is insufficient for the propulsion element to propel the aerial platform beyond a specified flight envelope during the time when the optical power receiver does not receive optical power.

22. The method of claim 17, wherein generating the indication from the aerial platform by the at least one sensor circuit includes generating a temperature value from a temperature sensor based on a temperature of the optical power receiver or generating a charge value from a charge state sensor based on a state of charge of the energy storage element.

23. The method of claim 17, further comprising automatically controlling, via the at least one controller, at least one of the following:
   altitude of the aerial platform during flight,
   position, relative to the optical power source, of the aerial platform during flight,
   pitch angle of the aerial platform during flight,
   roll angle of the aerial platform during flight,
   yaw angle of the aerial platform during flight,
   velocity of the aerial platform during flight,
   flight path of the aerial platform during flight, and
   tension on a tether coupled to the aerial platform during flight.

24. The method of claim 17, further comprising:
   detecting an unsafe condition via safety system logic integrated with the aerial platform; and
   in response to detecting the unsafe condition, operating the at least one controller to automatically direct performance of at least one of the following:
      landing the aerial platform,
      communicating a command to the optical power source via the data transfer mechanism to direct a suspension of optical power emission from the optical power source,
      detaching, via an emergency disconnect mechanism, an end of a tether from a point of attachment, the tether having a first end coupled to the optical power source and a second end coupled to the aerial platform,
      severing, via the emergency disconnect mechanism, the tether, and
      generating a user notification and communicating the user notification from the aerial platform to the optical power source via the data transfer mechanism, for output via a user interface associated with the optical power source.

25. A device to power an aerial platform, comprising:
   a laser-based optical power source coupleable to a first end of an optical transmission element, the laser-based optical power source arranged to transmit optical energy towards a second end of the optical transmission element coupleable to the aerial platform, wherein an optical power receiver of the aerial platform is arranged to receive at least some of the optical energy produced by the laser-based optical power source and further arranged to convert at least a portion of the received optical energy into captured electric power for storage in an energy storage element associated with the aerial platform;
   at least one detection device arranged to receive aerial platform information from the aerial platform via a data transfer mechanism coupled between the optical power source and the aerial platform, wherein the aerial platform information is generated by at least one sensor circuit associated with the aerial platform, wherein the at least one sensor is arranged to pass sensor information to an aerial-platform-based controller, and wherein the aerial-platform-based controller is arranged to pass the sensor information to the at least one detection device via the data transfer mechanism;
   a safety system coupled to the at least one detection device, the safety system arranged to generate a determination that integrity of the optical transmission element is compromised based on the aerial platform information, wherein the safety system is arranged to direct the aerial platform to land based on a determined unsafe condition; and an optical-power-source-based controller programmed to variably direct how much optical energy is output from the optical power source based on the aerial platform information communicated via the data transfer mechanism.

26. The device of claim 25, further comprising:
a base unit;
a tether coupleable to the aerial platform, the tether operable to constrain motion of the aerial platform relative to the base unit;
a tether deployment mechanism operable to controllably deploy and retract the tether; and
an emergency disconnect mechanism coupled to the safety system and arranged to release the aerial platform based on a determined unsafe condition.

27. The device of claim 26, wherein the optical-power-source-based controller is programmed to controllably deploy the tether via the tether deployment mechanism to a determined length based on length data from at least one first sensor circuit and wherein the optical-power-source-based controller is programmed to control tension of a deployed tether based on tension data from at least one second sensor circuit.

28. The device of claim 25, wherein the determined unsafe condition includes at least one of:

an unsafe wind speed condition determined using information generated by at least one wind speed sensor circuit;
an unsafe wind gust condition determined using information generated by the at least one wind speed sensor circuit;
an unsafe altitude condition determined using information generated by at least one altimeter sensor circuit;
an unsafe velocity condition determined using information generated by at least one accelerometer circuit;
an unsafe orientation condition determined using information generated by at least one orientation circuit;
an unsafe energy level condition determined using information generated by at least one charge state sensor circuit;
a hardware fault determined via safety system logic integrated with the aerial platform;
a break in the tether determined via the safety system logic integrated with the aerial platform;
a software fault determined via the safety system logic integrated with the aerial platform; and
an unsafe temperature condition determined using information generated by at least one temperature sensor circuit.

29. The device of claim 25 wherein the aerial platform information is representative of a temperature of the optical power receiver.

* * * * *